3,752,806
BENZODIAZEPINES
Hisao Yamamoto, Nishinomiya, Shigeho Inaba, Takarazuka, Toshiyuki Hirohashi, Ashiya, Michihiro Yamamoto, Toyonaka, Kikuo Ishizumi and Mitsuhiro Akatsu, Ikeda, Isamu Maruyama, Minoo, Yoshiharu Kume, Takarazuka, Kazuo Mori, Kobe, and Takahiro Izumi, Takarazuka, Japan, assignors to Sumitomo Chemical Company, Limited, Osaka, Japan
No Drawing. Filed Aug. 16, 1971, Ser. No. 172,298
Claims priority, application Japan, Aug. 24, 1970, 45/74,410
Int. Cl. C07d 53/06
U.S. Cl. 260—239.3 D        6 Claims

ABSTRACT OF THE DISCLOSURE

Novel benzodiazepines represented by the formula,

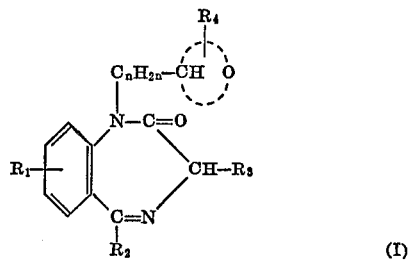

wherein $R_1$ represents hydrogen, halogen, nitro, $C_{1-4}$ alkoxy, cyano or trifluoromethyl; $R_2$ represents a group of the formula,

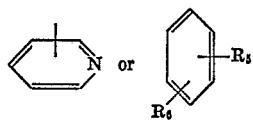

(wherein $R_5$ and $R_6$ represent hydrogen, halogen, trifluoromethyl, cyano or $C_{1-4}$ alkyl); $R_3$ and $R_4$ represent hydrogen or $C_{1-4}$ alkyl; and $n$ represents an integer of 1 to 4 are prepared by reacting a 1-unsubstituted benzodiazepine represented by the formula,

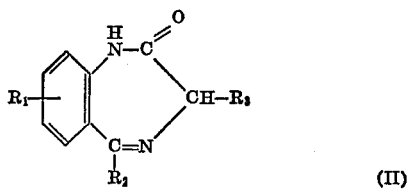

wherein $R_1$, $R_2$ and $R_3$ are as defined above, with a reactive ester of alcohol represented by the formula

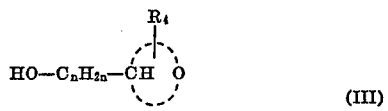

wherein $R_4$ is as defined above.

The benzodiazepine derivatives of the Formula I have valuable pharmacological properties, in particular excellent tranquilizing, sedative, muscle relaxant, anticonvulsant and hexobarbital potentiating activities.

---

This invention relates to novel benzodiazepines, process for preparation thereof and pharmaceutical composition containing the same. More particularly, this invention pertains to novel benzodiazepines represented by the formula:

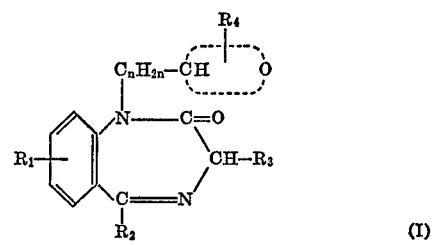

wherein $R_1$ represents hydrogen, halogen, nitro, $C_{1-4}$ alkoxy, cyano or trifluoromethyl; $R_2$ represents a group of the formula,

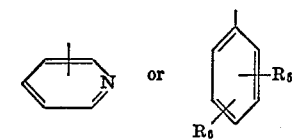

(wherein $R_5$ and $R_6$ represent hydorgen, halogen, trifluoromethyl, cyano or $C_{1-4}$ alkyl); $R_3$ and $R_4$ represent hydrogen or $C_{1-4}$ alkyl; and $n$ represents an integer of 1 to 4.

In the compounds represented by the Formula I, examples of the halogen atom include chlorine, bromine, iodine and fluorine atoms; examples of $C_{1-4}$ alkoxy group include methoxy, ethoxy, n-propoxy, isopropoxy, n-butoxy, isobutoxy and t-butoxy groups, and examples of $C_{1-4}$ alkyl group include methyl, ethyl, propyl, iso-propyl, n-butyl, isobutyl and t-butyl groups. The —$C_nH_{2n}$— group represents a straight or branched chain alkylene group having 1 to 4 carbon atoms, and includes, for example, methylene, ethylene, 1-methylethylene, 2-methylethylene, trimethylene, 1-methyltrimethylene and 2-methyltrimethylene groups.

The group of the formula,

signifies a 3- to 6-membered cyclic ether; examples of the 3- to 6-membered cyclic ether include tetrahydropyranyl, tetrahydrofuryl, 1,3-epoxypropyl and 1,2-epoxyethyl groups.

It has surprisingly been found by the present inventors that the compounds represented by the Formula I and their pharmaceutically acceptable salts with inorganic and organic acids, have valuable pharmacological properties, in particular excellent tranquilizing, sedative, muscle relaxant, anticonvulsant and hexobarbital potentiating activities.

Accordingly, an object of the present invention is to provide novel and useful benzodiazepines and salts thereof which have excellent pharmacological properties. Another object is to provide a process for producing such novel and useful benzodiazepines and salts thereof. A further object is to provide pharmaceutical composition containing such novel and useful benzodiazepines or salts thereof. Other objects and merits of the present invention will be apparent from the following descriptions.

In order to accomplish these objects the present invention provides novel benzodiazepines represented by the Formula I and acid addition salts thereof.

The benzodiazepines of the Formula I can be obtained by reacting a 1-unsubstituted benzodiazepine represented by the formula,

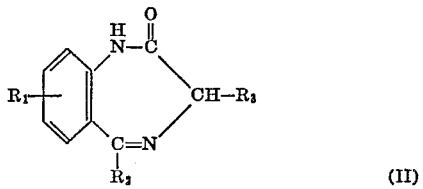

wherein $R_1$, $R_2$ and $R_3$ are as defined in Formula I above, with a reactive ester of an alcohol represented by the formula,

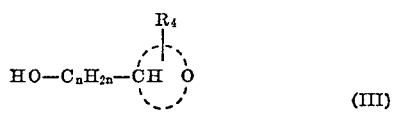

wherein $R_4$ and $n$ are as defined above. Examples of the reactive esters include hydrohalic acid esters such as the chloride, bromide and iodide and sulfonic acid esters such as methanesulfonate, p-toluenesulfonate, β-naphthalenesulfonate and trichloromethanesulfonate. The reaction may be carried out by reacting a compound of the Formula II with a reactive ester of the compound of the Formula III in the presence of an alkaline agent or by contacting the compound of the Formula II with an alkaline agent to form the metal salt and then contacting the resulting metal salt with a reactive ester of the compound of the Formula III. Examples of the alkaline agents include alkali metal hydride such as sodium hydride or lithium hydride, alkali metal hydroxide such as potassium hydroxide, alkali metal amide such as sodium amide, potassium amide or lithium amide, alkylalkali such as butyl lithium, phenylalkali such as phenyl lithium, alkali metal alcoholate such as sodium methylate, sodium ethylate, potassium tertiary-butoxide or the like. The reaction may generally be effected in an organic solvent or solvent mixture. Suitable solvents include benzene, toluene, xylene, dimethylformamide, dimethylacetamide, diphenyl ether, diglyme, dimethyl sulfoxide, methyl ethyl ketone, N-methyl pyrrolidone and the like, and a solvent mixture thereof. The reaction may be carried out at a temperature within the range between about room temperature and the boiling point of the solvent employed.

The thus obtained benzodiazepine derivatives of the Formula I form pharmaceutically acceptable acid addition salts with pharmaceutically acceptable inorganic and organic acids such as hydrochloric acid, hydrobromic acid, sulfuric acid, phosphoric acid, nitric acid, acetic acid, maleic acid, fumaric acid, tartaric acid, succinic acid, citric acid, camphorsulfonic acid, ethanesulfonic acid, ascorbic acid, lactic acid, and the like.

The benzodiazepine derivatives of the Formula I or their pharmaceutically acceptable acid addition salts are useful as tranquilizers, sedatives, muscle relaxants, hypnotics and anticonvulsants.

Illustratively, 1-(β,γ-epoxypropyl)-5-(o-fluorophenyl)-7-chloro-1,3-dihydro-2H-1,4-benzodiazepin-2-one (hereinafter referred to as "compound A" and 1-tetrahydrofurfuryl - 5 - (o-fluorophenyl)-7-chloro-1,3-dihydro-2H-1,4-benzodiazepin-2-one (hereinafter referred to as "compound B") show much potent anticonvulsant activities. The result of comparative anti-pentylenetetrazole test in mice is given in the following Table 1. These pharmacological activities of the present compounds are found to be more potent than those of the chemically related compound, chlorodiazepoxide (i.e., 2-methylamino-5-phenyl-7-chloro-3H-1,4-benzodiazepin-4-oxide).

TABLE 1

| Compounds tested: | Anti-pentylenetetrazol effects $ED_{50}$ (mg./kg., p.o., in mice) |
|---|---|
| Present compounds: | |
| "Compound A" | 0.13 |
| "Compound B" | 0.7 |
| Reference compound—Chlorodiazepoxide | 8.0 |

Benzodiazepines or salts thereof of the present invention can be administered parenterally or orally in therapeutic dosage forms with dosage adjusted to individual needs, that is, in solid or liquid dosage forms such as tablets, dragées, capsules, suspensions, solutions, elixirs and the like.

This invention is further illustrated by the following examples of preferred embodiments thereof, which are presented for the purpose of illustration and are not intended to limit the scope of the invention.

EXAMPLE 1

A solution of 5 g. of 5-(o-fluorophenyl)-7-chloro-1,3-dihydro-2H-1,4-benzodiazepin-2-one in 40 ml. of N,N-dimethylformamide is added to a suspension of 1.25 g. of sodium methoxide in 40 ml. of N,N-dimethylformamide, and the mixture is heated at 50°–60° C. for 1 hour. After the mixture is cooled, 2.4 g. of epichlorohydrin in 20 ml. of dry toluene is added thereto below 10° C. and then the mixture is stirred at room temperature for 1 hour and at 60°–70° C. for 3 hours. The reaction mixture is cooled, poured into ice-water, and extracted with methylene chloride. The methylenechloride extracts are combined and washed with saturated sodium chloride solution, dried over anhydrous sodium sulfate, and concentrated to dryness. The residue is dissolved in chloroform, chromatographed on silica gel and eluted with chloroform to give a syrup which crystallized from isopropylether. Recrystallization from isopropyl ethermethylenechloride mixture gives 1-(β,γ - epoxypropyl)-5-(o-fluorophenyl)-7-chloro-1,3-dihydro-2H-1,4-benzodiazepin - 2 - one as colorless prisms, M.P. 118°–119° C.

EXAMPLE 2

A solution of 1 g. of 5-(o-fluorophenyl)-7-chloro-1,3-dihydro-2H-1,4-benzodiazepin-2-one in 15 ml. of toluene and 15 ml. of N,N-dimethylformamide is added to 0.15 g. of 63% sodium hydride-mineral oil dispersion, and the mixture is heated at 50°–60° C. for half an hour. To the mixture is added 0.69 g. of tetrahydrofurfuryl bromide, and then the mixture is heated at 90°–95° C. for 3 hours. After the reaction mixture is cooled, poured into water, and extracted with chloroform. The chloroform extracts are combined, washed with saturated sodium chloride solution, dried over anhydrous sodium sulfate, and concentrated to dryness. The residue is dissolved in chloroform, chromatographed on silica gel and eluted with chloroform-ethyl acetate (1:1) to give a pale yellow viscous oil of 1-tetrahydrofurfuryl-5-(o-fluorophenyl)-7-chloro-1,3-dihydro-2H-1,4-benzodiazepin - 2 - one, having infrared absorption band at 1665 cm.$^{-1}$.

Similarly, the following compound is obtained: 1-tetrahydrofurfuryl-5-(o - chlorophenyl)-7-chloro-1,3-dihydro-2H-1,4-benzodiazepin-2-one as pale yellow viscous oil, having infrared absorption band at 1665 cm.$^{-1}$.

What is claimed is:
1. A benzodiazepine represented by the formula,

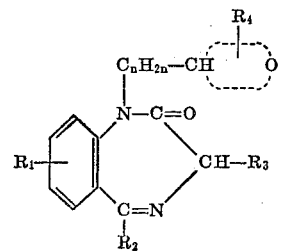

wherein $R_1$ represents hydrogen, halogen, nitro, $C_{1-4}$ alkoxy, cyano or trifluoromethyl; $R_2$ represents a group of the formula,

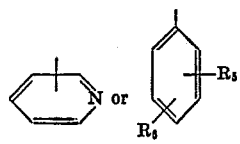

(wherein $R_5$ and $R_6$ represent hydrogen, halogen, trifluoromethyl, cyano or $C_{1-4}$ alkyl); $R_3$ and $R_4$ represent hydrogen or $C_{1-4}$ alkyl;

signifies a member selected from the group consisting of tetrahydropyranyl, tetrahydrofuryl, 1,3-epoxypropyl and 1,2-epoxyethyl; and $n$ represents an integer of 1 to 4; and pharmaceutically acceptable acid addition salts therof.

2. Benzodiazepine derivative according to claim 1, wherein $R_1$ is halogen at 7-position and $R_2$ is o-halogenophenyl.

3. Benzodiazepine derivative according to claim 2, wherein a group of the formula

is tetrahydropyranyl.

4. Benzodiazepine derivative according to claim 2, wherein a group of the formula

is tetrahydrofuryl.

5. Benzodiazepine derivative according to claim 2, wherein a group of the formula

is 1,3-epoxypropyl.

6. Benzodiazepine derivative according to claim 2, wherein a group of the formula

is 1,2-epoxyethyl.

References Cited
UNITED STATES PATENTS
3,391,138   7/1968   Archer et al. ____ 260—239.3 D HENRY R. JILES, Primary Examiner
R. T. BOND, Assistant Examiner U.S. Cl. X.R.
260—348 R, 347.8, 345.9, 333; 424—285, 283, 278, 263